US012319187B2

(12) United States Patent
Kapusky

(10) Patent No.: US 12,319,187 B2
(45) Date of Patent: Jun. 3, 2025

(54) REMOTE HANDLE ASSEMBLY WITH MODULAR PULLEY ARRANGEMENT

(71) Applicant: MAGNA SEATING INC., Aurora (CA)

(72) Inventor: Michael Kapusky, South Lyon, MI (US)

(73) Assignee: Magna Seating Inc., Aurora (CA)

( * ) Notice: Subject to any disclaimer, the term of this patent is extended or adjusted under 35 U.S.C. 154(b) by 0 days.

(21) Appl. No.: 18/700,811

(22) PCT Filed: Nov. 14, 2022

(86) PCT No.: PCT/US2022/049776
§ 371 (c)(1),
(2) Date: Apr. 12, 2024

(87) PCT Pub. No.: WO2023/086614
PCT Pub. Date: May 19, 2023

(65) Prior Publication Data
US 2024/0416813 A1 Dec. 19, 2024

Related U.S. Application Data

(60) Provisional application No. 63/263,953, filed on Nov. 12, 2021.

(51) Int. Cl.
*B60N 2/90* (2018.01)
*B60N 2/20* (2006.01)
(Continued)

(52) U.S. Cl.
CPC .............. *B60N 2/933* (2018.02); *B60N 2/20* (2013.01); *B60N 2/22* (2013.01); *F16C 1/106* (2013.01); *F16C 1/12* (2013.01)

(58) Field of Classification Search
CPC . B60N 2/933; B60N 2/20; B60N 2/22; B60N 2/2356; B60N 2/0296; F16C 1/106; F16C 1/12
See application file for complete search history.

(56) References Cited

U.S. PATENT DOCUMENTS 7,802,490 B2   9/2010   Ingraham
10,385,955 B2  8/2019   Dankbaar
(Continued)

FOREIGN PATENT DOCUMENTS

CN       110217141 A  *  9/2019  .............. B60N 2/22
KR   10-2020-0132418 A     11/2020
(Continued)

OTHER PUBLICATIONS

Translation of CN-110217141-A, Zhang et al., Sep. 10, 2019 (Year: 2019).*

Primary Examiner — Vinh Luong
(74) Attorney, Agent, or Firm — Miller Canfield

(57) ABSTRACT

A remote handle assembly for selectively unlocking a component in a seat assembly for an automotive vehicle comprises a rear housing having a boss, a spline shaft pivotally coupled to the boss around an axis of rotation, and a pulley pivotally coupled to the boss around the axis of rotation. The spline shaft includes a cam surface and a pulley channel extending circumferentially around the axis of rotation. The spline shaft is pivotable between an unactuated position and an actuated position. The pulley includes an engagement surface and an upper pulley channel extending circumferentially around the axis of rotation. The pulley is pivotable between a second unactuated position and a second actuated position. The pulley is spaced between the spline shaft and the rear housing. The upper pulley channel in the pulley axially aligns with the pulley channel in the spline shaft. The cam surface of the spline shaft is configured to frictionally (Continued)

engage with the engagement surface on the pulley as the spline shaft rotates towards the actuated position.

18 Claims, 10 Drawing Sheets

(51) Int. Cl.
*B60N 2/22* (2006.01)
*F16C 1/10* (2006.01)
*F16C 1/12* (2006.01)

(56) References Cited

U.S. PATENT DOCUMENTS

| | | | |
|---|---|---|---|
| 10,675,997 B2 | 6/2020 | Tomandl | |
| 2003/0062749 A1* | 4/2003 | Liu | B60N 2/943 |
| | | | 297/284.4 |
| 2017/0203676 A1* | 7/2017 | Dunn | B60N 2/933 |
| 2020/0282876 A1 | 9/2020 | Tomandl | |
| 2023/0150401 A1* | 5/2023 | Zang | B60N 2/2227 |
| | | | 297/463.1 |
| 2024/0317118 A1* | 9/2024 | Toutant | B60N 2/22 |

FOREIGN PATENT DOCUMENTS

| | | | | |
|---|---|---|---|---|
| KR | 1020207896 B1 * | 1/2021 | | B60N 2/22 |
| WO | WO-2013018869 A1 * | 2/2013 | | B60N 2/0296 |
| WO | WO2013085903 A1 | 6/2013 | | |

* cited by examiner

FIG. 12
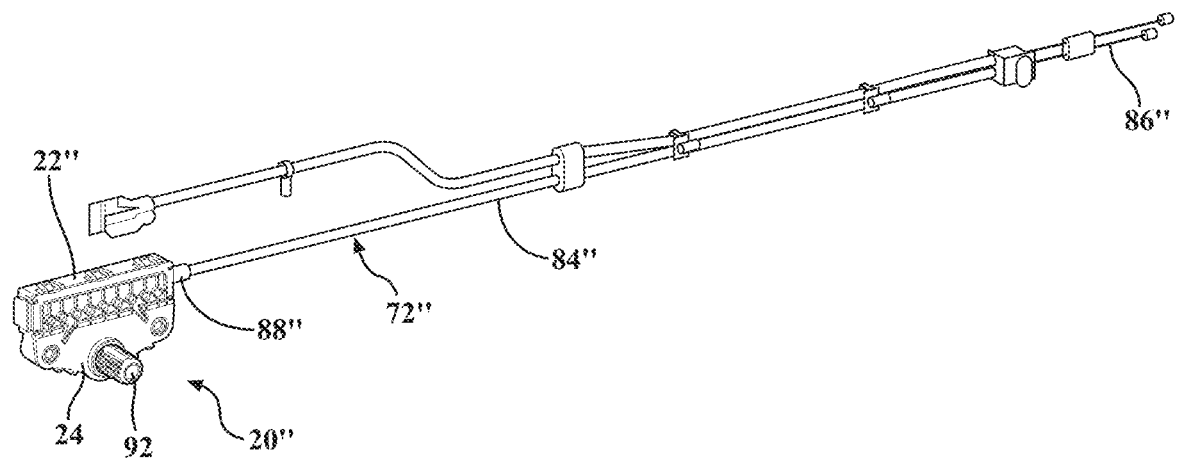
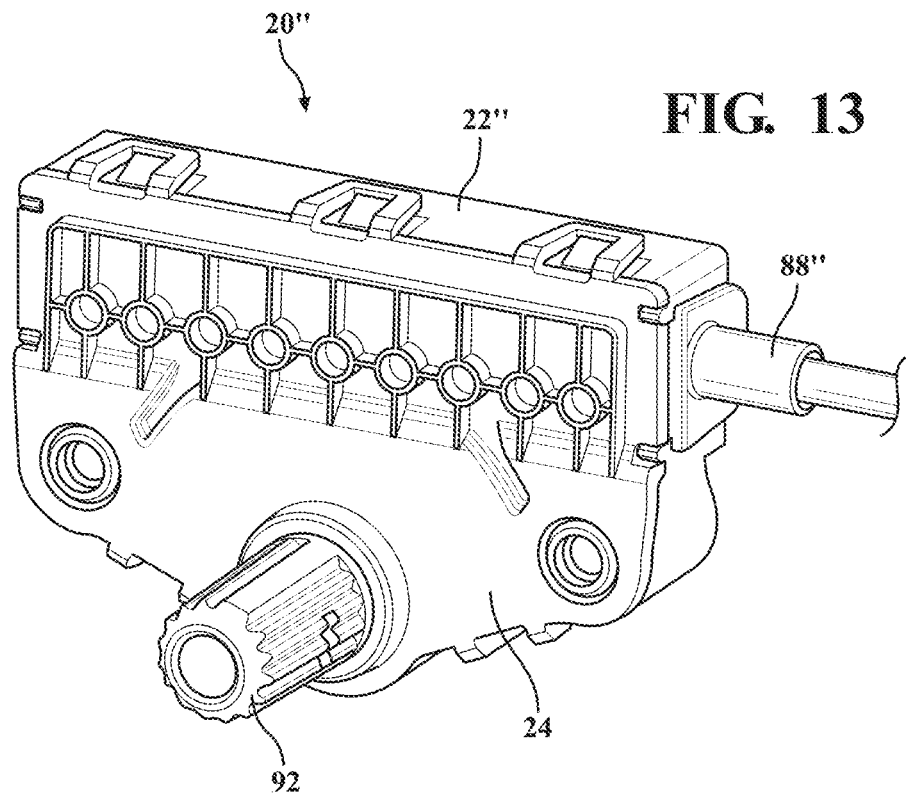
FIG. 13

REMOTE HANDLE ASSEMBLY WITH MODULAR PULLEY ARRANGEMENT

CROSS-REFERENCE TO RELATED APPLICATIONS

This application claims priority to U.S. Provisional Application 63/263,953, filed on Nov. 12, 2021, the disclosure of which is hereby incorporated by reference in its entirety.

FIELD OF THE INVENTION

The present invention relates to a remote handle assembly for use in an automotive seat assembly. More particularly, the invention relates to a remote handle assembly having a modular pulley arrangement and configured to unlock a recliner mechanism in a seat assembly.

DESCRIPTION OF RELATED ART

Automotive vehicles typically include one or more seat assemblies having a seat cushion and a seat back for supporting a passenger above a vehicle floor. The seat assemblies often include inboard and outboard recliner mechanisms pivotably coupling the seat back to the seat cushion. It is commonly known for the recliner mechanisms to prevent rotation of the seat back relative to the seat cushion when the recliner mechanism is locked. The recliner mechanisms typically include an unlocking component, such as a recliner crank or a release lever, which is actuatable by a release cable.

Further, the seat assemblies often include a remote handle assembly configured to selectively unlock the recliner mechanism. It is commonly known for the remote handle assembly to include a handle pivotable by an occupant to unlock the recliner mechanisms so that the occupant may adjust the seat back position. In addition, it is commonly known for the remote handle assembly to be optionally actuated by a power actuator, such as when the seat assembly includes a fold flat feature. A remote handle assembly operatively connected to a power actuator is commonly described as having a one touch feature (OTF). Non-OTF remote handle assemblies rely on manual operation of the handle to release the recliner mechanisms.

An exemplary non-OTF remote handle assembly, described in U.S. Pat. No. 10,675,997, includes a pulley fixedly coupled to a handle spline and operatively coupled to a release cable. The pulley applies tension to the release cable in response to the occupant pivoting a handle attached to the handle spline to an actuated position. The recliner mechanisms are unlocked when tension is applied to the release cable. When the occupant releases the handle, a return spring rotates the pulley back to an unactuated position which allows the recliner mechanisms to be locked.

An exemplary OTF remote handle assembly, described in Korea Patent 10-2207896, unlocks the recliner mechanisms with a power actuator and with a handle. The remote handle assembly includes a main pulley pivotally connected to the handle spline which is fixedly coupled to the handle. The handle spline includes a tab that travels in a slot in the main pulley so that the main pulley is selectively decoupled from the handle spline. Rotating the handle spline towards the actuated position causes the main pulley to pivot and apply tension to the release cable causing the recliner mechanisms to unlock. A second pulley is pivotally coupled to the main pulley and operatively coupled to an actuator cable connected to the power actuator. To automatically unlock the recliner mechanisms, the power actuator applies tension to the actuator cable causing the second pulley to pivot and engage with the main pulley and causes the main pulley to rotate towards the actuated position while the main pulley is decoupled from the handle spline. The handle remains stationary as the main pulley is rotated since the handle spline is decoupled from the main pulley.

However, decoupling the main pulley from the handle spline adds cost and manufacturing process complexity to the OTF remote handle assembly. In addition, it is common for remote handle assemblies to have unique components that are customized for each design application, such as for different seat assemblies or for different OTF and non-OTF versions.

It is desirable, therefore, to provide a remote handle assembly that includes common components for both the OTF and non-OTF versions. In addition, it is desirable to eliminate components that decouple the main pulley from the handle spline. It is also desirable to provide a remote handle assembly having less components so that the cost is reduced, and the manufacturing process is less complex.

SUMMARY OF THE INVENTION

According to one embodiment, there is provided a remote handle assembly for selectively unlocking a component in a seat assembly for an automotive vehicle. The remote handle assembly comprises a rear housing having a boss, a spline shaft pivotally coupled to the boss around an axis of rotation, and a pulley pivotally coupled to the boss around the axis of rotation. The spline shaft includes a cam surface and a pulley channel extending circumferentially around the axis of rotation. The spline shaft is pivotable between an unactuated position and an actuated position. The pulley includes an engagement surface and an upper pulley channel extending circumferentially around the axis of rotation. The pulley is pivotable between a second unactuated position and a second actuated position. The pulley is spaced between the spline shaft and the rear housing. The upper pulley channel in the pulley axially aligns with the pulley channel in the spline shaft. The cam surface of the spline shaft is configured to frictionally engage with the engagement surface on the pulley as the spline shaft rotates towards the actuated position.

BRIEF DESCRIPTION OF THE DRAWINGS

Advantages of the present invention will be readily appreciated as the same becomes better understood by reference to the following detailed description when considered in connection with the accompanying drawings wherein:

FIG. 12 is a perspective view of a remote handle assembly, according to another embodiment of the present invention;

FIG. 13 is an enlarged view of the remote handle assembly of FIG. 12;

DETAILED DESCRIPTION OF THE EMBODIMENTS

FIGS. 1-18 illustrate components of an automotive seat assembly 10 according to embodiments described herein. Directional references employed or shown in the description, figures, or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
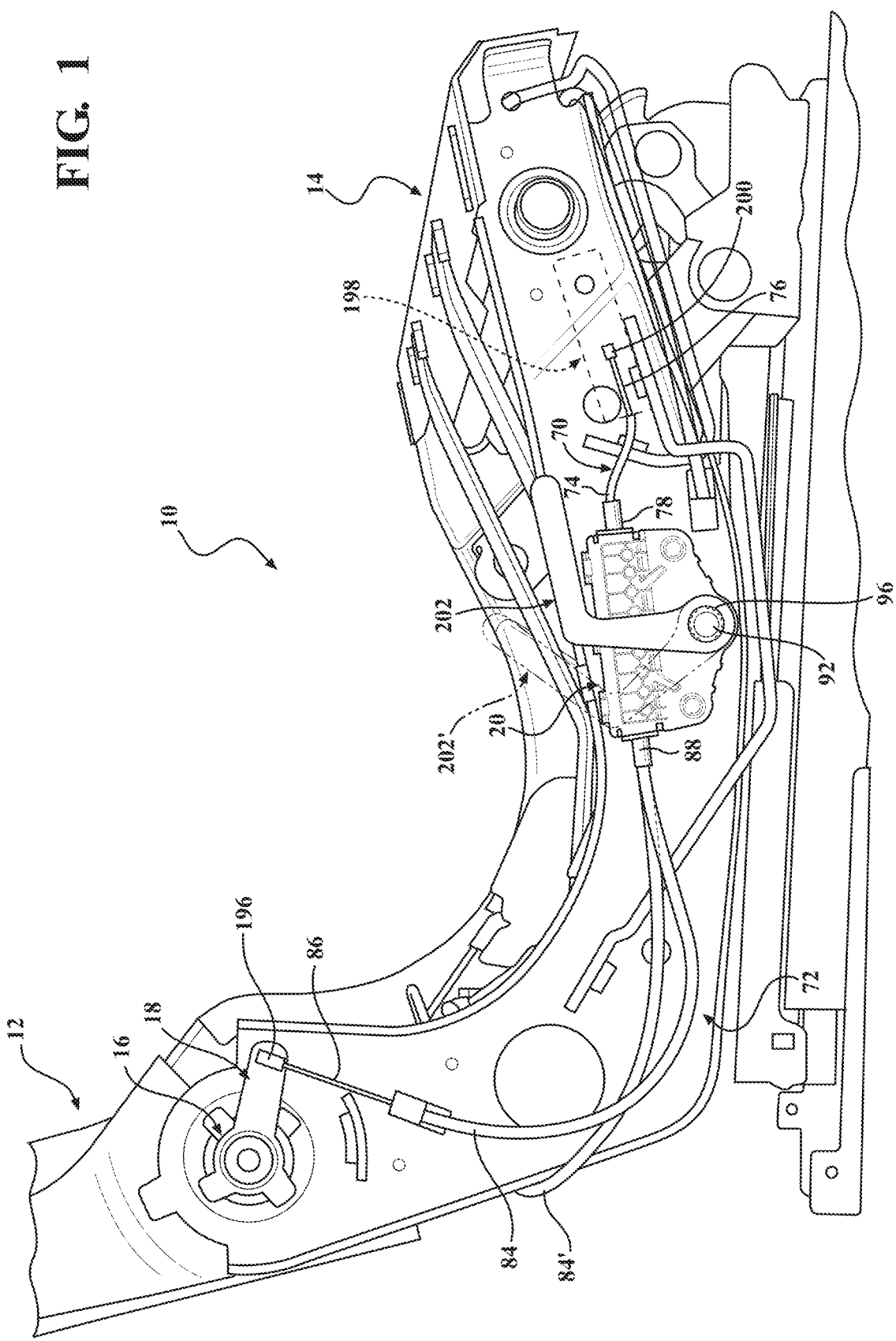
FIG. 1 is a side view of an automotive seat assembly having a remote handle assembly, according to one embodiment of the present invention.

As depicted in FIG. 1, the seat assembly 10 includes a seat back 12 pivotably coupled to a seat cushion 14 by inboard and outboard recliner mechanisms 16. The recliner mechanisms 16 are configured to prevent rotation of the seat back 12 relative to the seat cushion 14 while the recliner mechanisms 16 are locked. The recliner mechanisms 16 are selectively unlocked by actuating release levers 18 operatively coupled to the respective recliner mechanisms 16.

The seat assembly 10 includes a remote handle assembly 20 configured to actuate the release levers 18 to remotely unlock the recliner mechanisms 16. A first embodiment of the remote handle assembly 20 is shown in FIGS. 1-11. Components of the remote handle assembly 20 are mounted between a rear housing 22 and a front housing 24.

Referring to FIGS. 2-5, the rear housing 22 includes a base panel 26 extending between the opposing side walls 28, 28' and opposing end walls 30, 30'. Each end wall 30, 30' includes a U-shaped slot 32, 32'. Projecting generally perpendicularly from the base panel 26 is a generally cylindrical boss 34 having a passageway 36 extending longitudinally therethrough. A longitudinal axis of the boss 34 defines an axis of rotation 38. The rear housing 22 includes spaced apart corner bosses 40 extending from the base panel 26. A bore 42 extends longitudinally through each of the respective corner bosses 40. In an exemplary embodiment, the bores 42 extend through the base panel 26. Each corner boss 40 includes a side wall that defines a stop surface 44. In addition, spaced apart ledges 46 extend generally perpendicularly from one side wall 28 and terminate in respective tabs 48 extending at an angle from the side wall 28. In an exemplary embodiment, the side wall 28 adjacent the boss 34 includes an arcuate-shaped central segment 50 extending between opposing wing segments 52, 52'. The opposing wing segments 52, 52' are depicted as non-parallel, however, in alternate embodiments the opposing wing segments 52, 52' may be parallel to one another. Further, an arcuate-shaped notch 54 extends circumferentially along an upper edge of the central segment 50. In addition, a plurality of triangular-shaped projections 56 having a catch surface 58 extend from opposing side walls 28, 28' of the rear housing 22.

Figure 3:
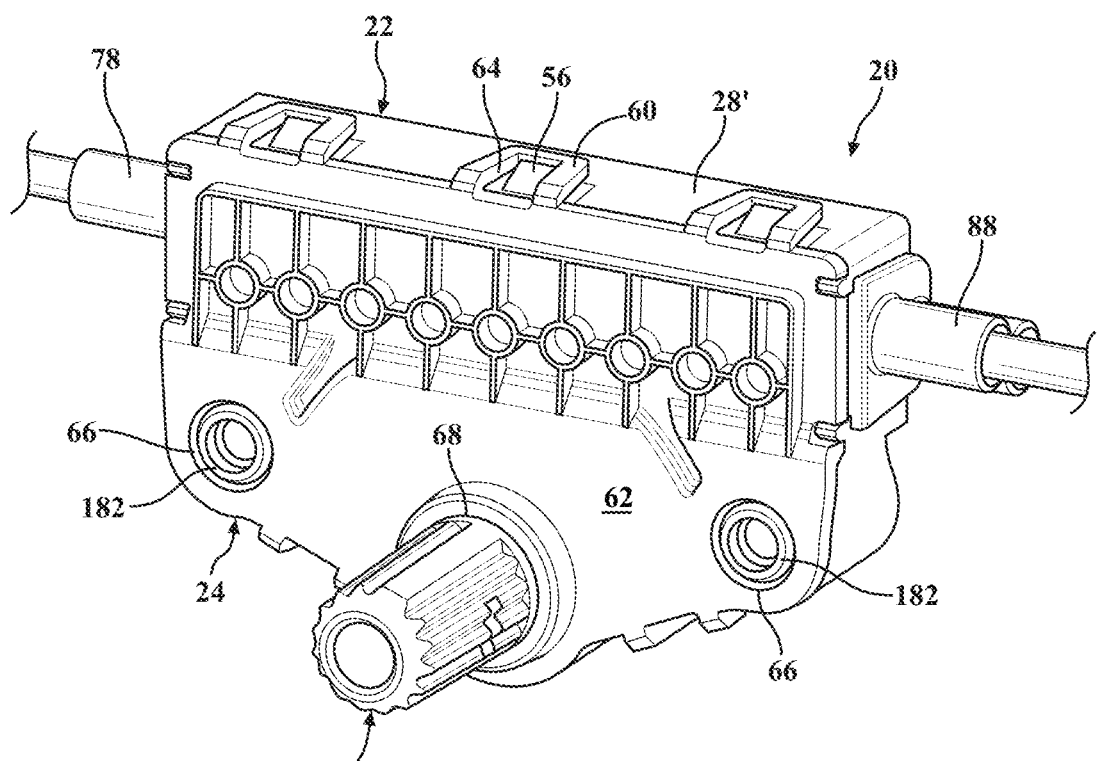
FIG. 3 is an enlarged view of a portion of the remote handle assembly of FIG. 2.
Figure 4:
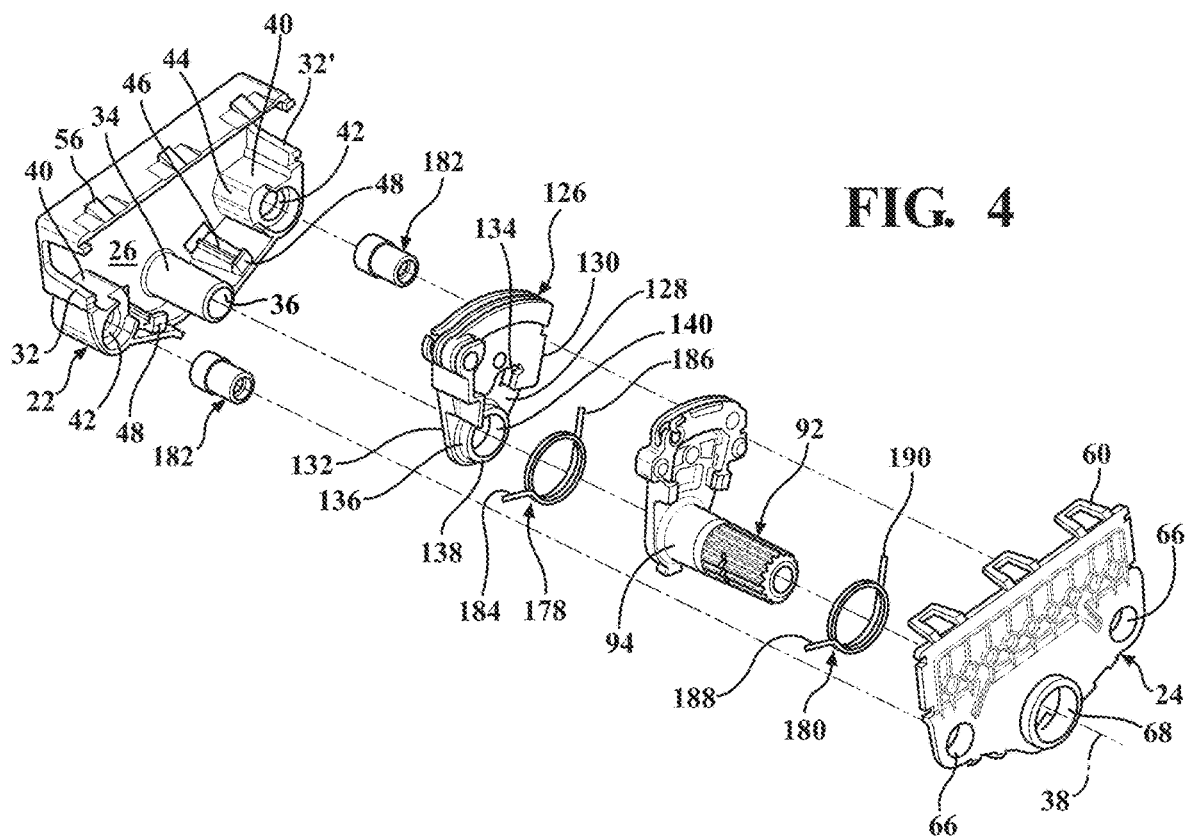
FIG. 4 is an exploded view of the remote handle assembly of FIG. 3.

Referring to FIGS. 3 and 4, the front housing 24 includes a plurality of U-shaped tabs 60 extending at generally right angles from an outer surface 62 of the front housing 24. A slot 64 in each of the U-shaped tabs 60 is configured to matingly engage with the catch surface 58 of the respective projections 56 on the rear housing 22 when the front housing 24 is assembled with the rear housing 22, as shown in FIG. 3. Extending through the front housing 24 are spaced apart mounting holes 66 and a centrally located spline hole 68. The mounting holes 66 are generally aligned with the bores 42 in the rear housing 22 when the front housing 24 is assembled with the rear housing 22.

Figure 9:
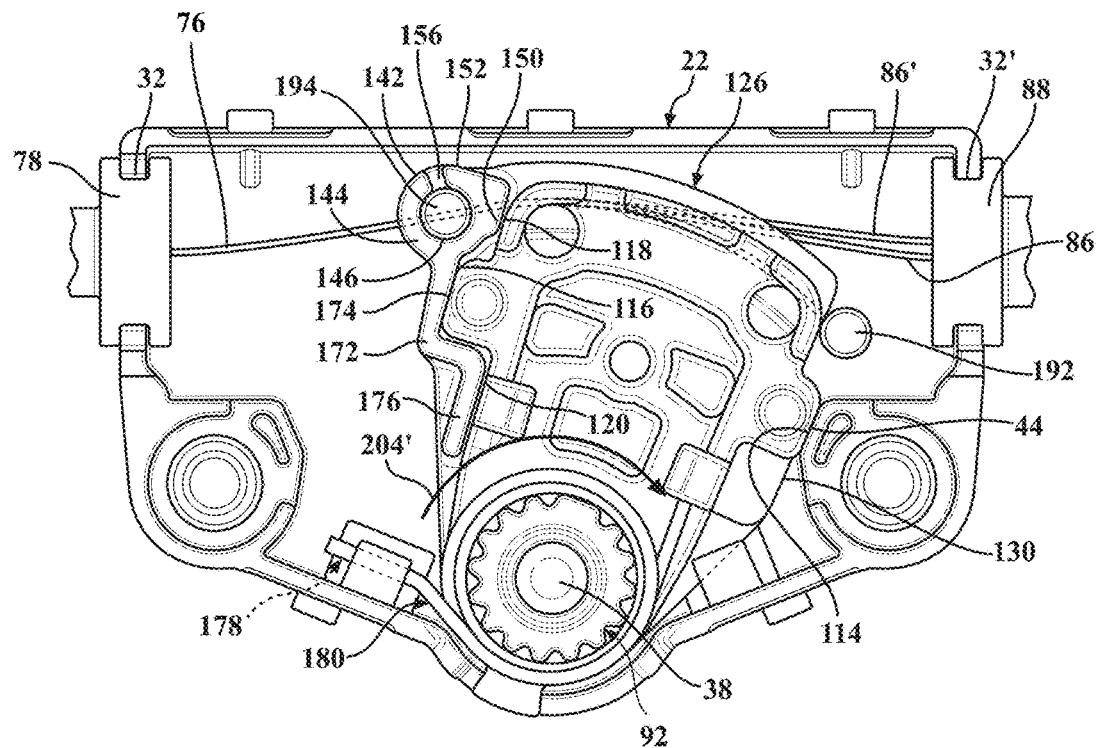
FIG. 9 is a cutaway top view of the remote handle assembly of FIG. 5 in an unactuated condition and showing Bowden cables connected to the OTF pulley.

As depicted in FIGS. 1 and 9, the remote handle assembly 20 also includes a power cable assembly 70 and a mechanism cable assembly 72. The power cable assembly 70 includes an outer casing 74, a power Bowden cable 76, and a power cable attachment 78. A proximal end of the outer casing 74 is fixedly coupled to the power cable attachment 78 which is fixedly coupled to one of the U-shaped slots 32, 32' in the rear housing 22. The power Bowden cable 76 extends longitudinally through the outer casing 74, through a passageway 80 (FIG. 5) in the power cable attachment 78, and into a cavity 82 in the rear housing 22.

Referring to FIGS. 2-5, the mechanism cable assembly 72 includes inboard and outboard outer casings 84, 84', outboard and inboard Bowden cables 86, 86' (i.e., release Bowden cables), and a manual cable attachment 88. Proximal ends of the outer casings 84, 84' are fixedly coupled to the manual cable attachment 88, which is fixedly coupled to the other one of the U-shaped slots 32, 32' in the rear housing 22. The Bowden cables 86, 86' extend longitudinally through the respective outer casings 84, 84', through respective passageways 90, 90' (FIG. 5) in the manual cable attachment 88, and into the cavity 82 in the rear housing 22.

Figure 5:
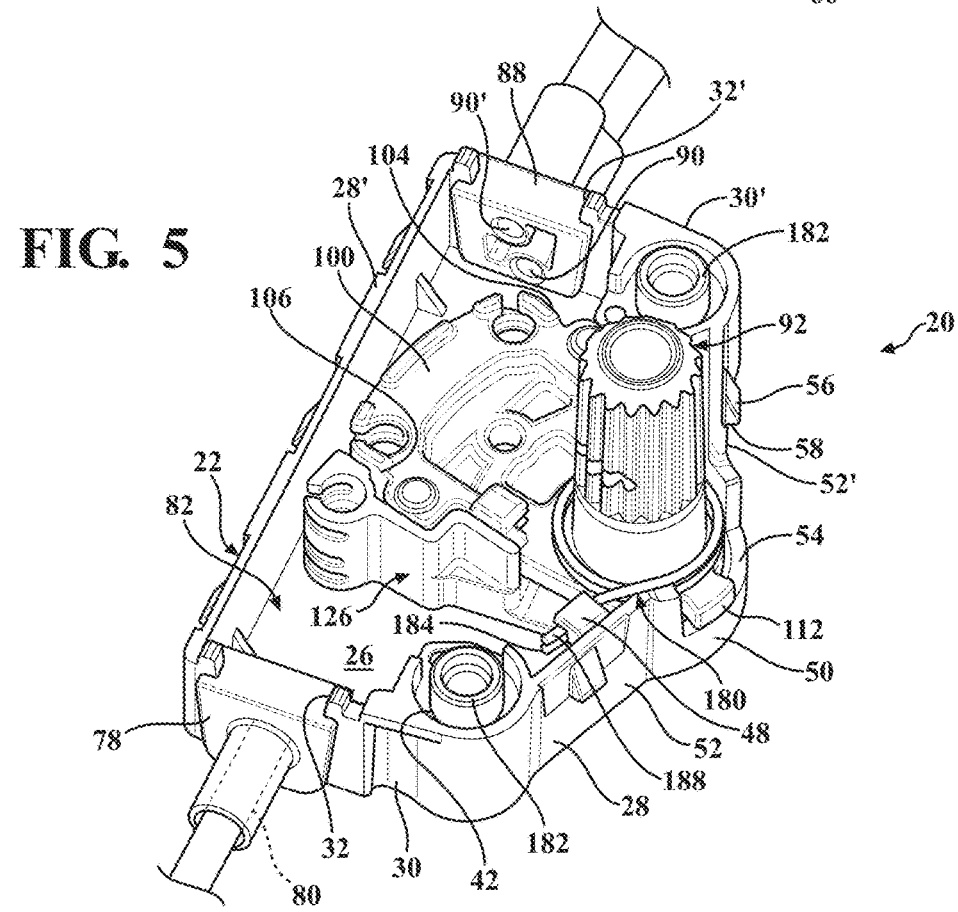
FIG. 5 is a cutaway perspective view of the remote handle assembly of FIG. 3.
Figure 6:
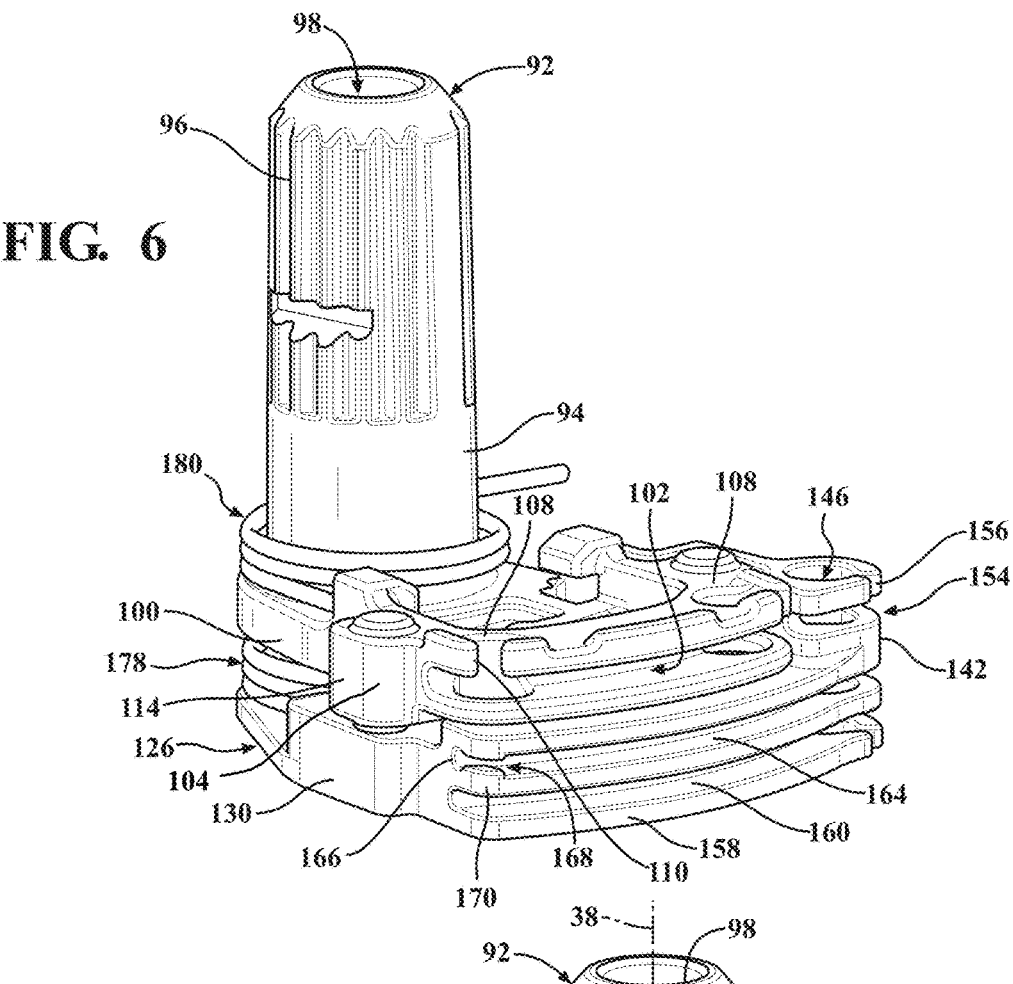
FIG. 6 is a cutaway left side view of a portion of the remote handle assembly of FIG. 5.
Figure 7:
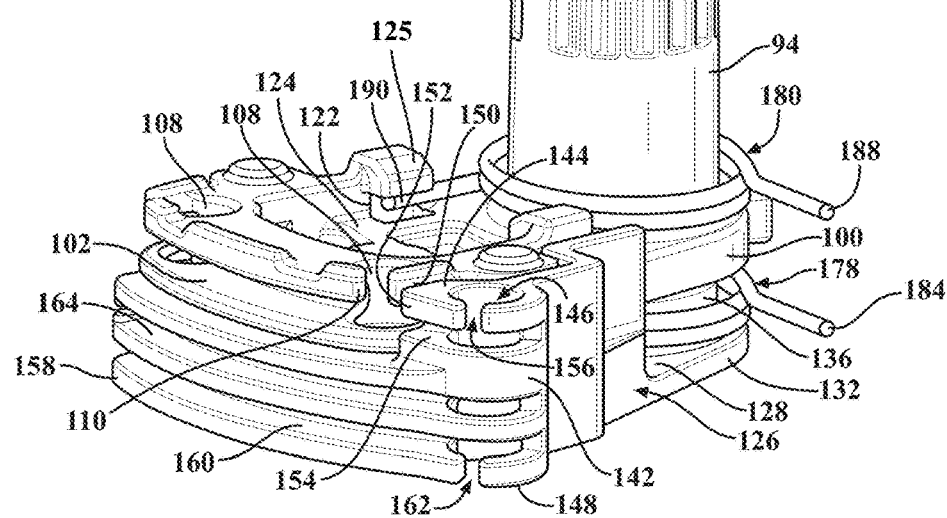
FIG. 7 is a cutaway right side view of the portion of the remote handle assembly of FIG. 6.
Figure 8:
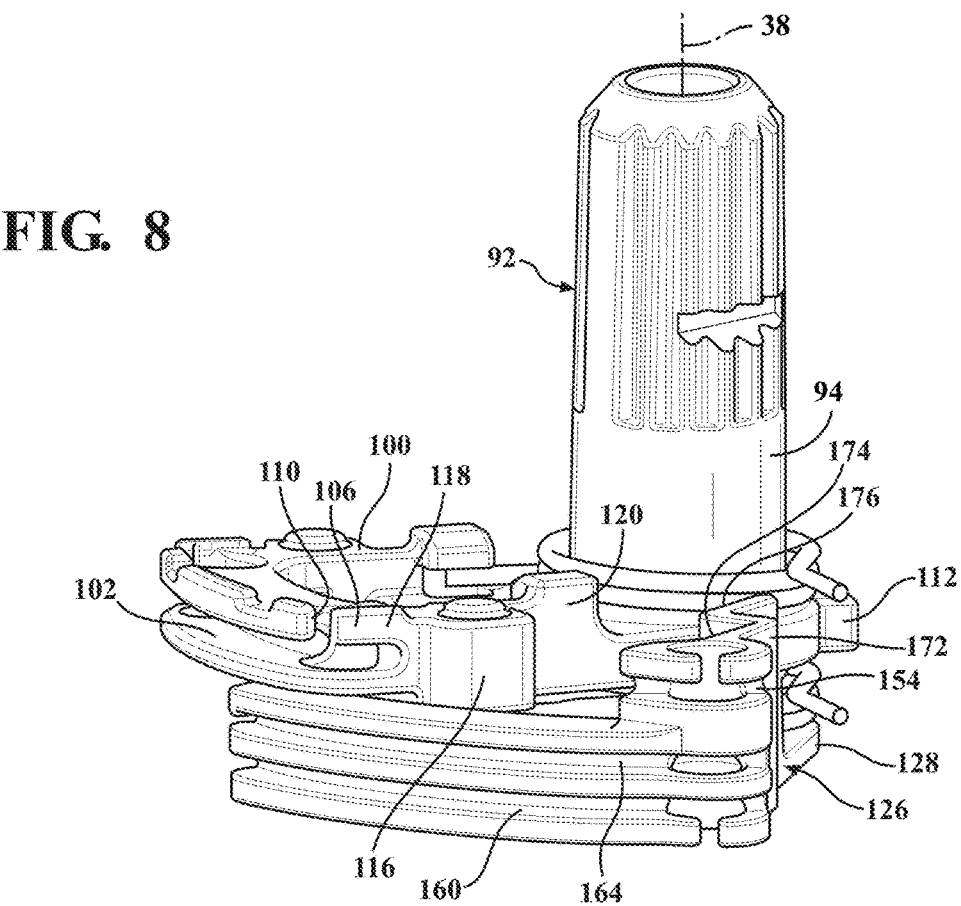
FIG. 8 is a cutaway right side view of the portion of the remote handle assembly of FIG. 7, showing a one touch feature (OTF) pulley pivoted relative to a spline shaft.

Referring to FIGS. 4-9, the remote handle assembly 20 also includes a spline shaft 92 pivotably coupled with the rear housing 22. Referring to FIGS. 6-8, the spline shaft 92 includes a generally cylindrical section 94 having an external spline 96 and a passageway 98 extending longitudinally through the cylindrical section 94. A sector 100 extends radially from a proximal end of the cylindrical section 94. A pulley channel 102 (i.e., spline shaft pulley) extends circumferentially along an outer portion of the sector 100 between trailing and leading sides 104, 106 of the sector 100. Opposing attachment holes 108 extend axially through the sector 100 and adjoin the pulley channel 102. Each attachment hole 108 includes a cable slot 110 extending generally radially outward to an exterior of the sector 100. As best shown in FIG. 8, an arm 112 projects radially from the sector 100 adjacent the cylindrical section 94 of the spline shaft 92. The arm 112 is configured to fit within the notch 54 in the central segment 50 of the rear housing 22, as shown in FIG. 5. Depicted in FIG. 6, a stop boss 114 projects from the trailing side 104 of the sector 100. Referring to FIG. 8, the leading side 106 defines a cam surface for the sector 100 and includes a second boss 116 spaced between side segments 118, 120. As depicted in FIG. 7, the sector 100 also includes a generally U-shaped notch 122 extending between a recessed portion 124 of the sector 100 and a ledge 125. The spline shaft 92 may have one or two pulley channels 102 without altering the scope of the present invention.

Referring to FIGS. 4-9, the remote handle assembly 20 also includes a one-touch feature (OTF) pulley 126 pivotably coupled with the rear housing 22. Referring to FIG. 4, the OTF pulley 126 includes a base 128 having generally a sector-shape and extending between trailing and leading sides 130, 132. The base 128 includes a spring notch 134, as illustrated in FIG. 4. In addition, a collar 136 projects generally perpendicular from a distal portion of the base 128 and terminates at a rim 138. Further, a passageway 140 extends longitudinally through the collar 136 and the base 128. The longitudinal axis of the collar 136 defines the axis of rotation 38 of the OTF pulley 126.

Referring to FIG. 7, the OTF pulley 126 includes a boss 142 having a generally cylindrical-shape and projecting from the base 128 and terminating at an upper surface 144. An attachment aperture 146 extends longitudinally through the boss 142 and through a bottom surface 148 of the base 128. The boss 142 also includes a lateral wall 150 and an end wall 152 extending downward from the upper surface 144. In addition, the lateral wall 150 is sized and shaped to frictionally engage with the outer side segment 118 of the spline shaft 92 after assembly, as shown in FIG. 9.

Shown in FIG. 7, the OTF pulley 126 also includes an upper pulley channel 154 (i.e., a first mechanism pulley) that extends circumferentially from an opening in the lateral wall 150, along the end wall 152 of the boss 142, through the aperture 146 in the boss 142, and terminates at another opening on the leading side 132. The upper pulley channel 154 is sized and shaped to axially align with the pulley channel 102 in the spline shaft 92 when the OTF pulley 126 is assembled with the spline shaft 92, as shown in FIG. 7. When assembled, the upper pulley channel 154 and the pulley channel 102 form a single pulley channel.

Further, an upper slot 156 extends radially from the aperture 146 through the end wall 152 of the boss 142, extends axially through the upper surface 144 of the boss 142, and adjoins the upper pulley channel 154. A portion of the aperture 146 adjacent the upper slot 156 defines an upper attachment location for one of the Bowden cables 86, 86' in the mechanism cable assembly 72 with the upper slot 156 allowing the Bowden cable 86, 86' to be inserted into the aperture 146 and along the upper pulley channel 154.

Depicted in FIG. 6, an outer wall 158 extends circumferentially along the base 128 between the cylindrical boss 142 and the trailing side 130 of the OTF pulley 126. Referring to FIG. 7, the OTF pulley 126 includes a lower pulley channel 160 (i.e., a second mechanism pulley) that extends circumferentially from an opening in the trailing side 130 along the outer wall 158, through the aperture 146 in the boss 142, and terminates at another opening on the leading side 132. Further, a lower slot 162 extends radially from the aperture 146 through the outer wall 158, extends axially through the bottom surface 148 of the base 128, and adjoins the lower pulley channel 160. A portion of the aperture 146 adjacent the lower slot 162 defines a lower attachment location for another one of the Bowden cables 86, 86' in the mechanism cable assembly 72 with the lower slot 162 allowing the Bowden cable 86, 86' to be inserted into the aperture 146 and along the lower pulley channel 160.

As shown in FIGS. 6 and 7, the OTF pulley 126 includes a center pulley channel 164 (i.e., a power actuator pulley) that extends circumferentially from a cable opening 166 in the trailing side 130 along the outer wall 158, through the aperture 146, and terminates at a third opening on the leading side 132. A narrow slot 168 extends between the center pulley channel 164 and through a wall portion 170 adjoining the trailing side 130 and the outer wall 158 of the OTF pulley 126. The narrow slot 168 allows the power Bowden cable 76 to be inserted into the center pulley channel 164. In addition, the center pulley channel 164 is spaced axially between the upper and lower pulley channels 154, 160.

Referring to FIGS. 8 and 9, a flange 172 extends from the boss 142 along the base 128 and generally towards the axis of rotation 38. The flange 172 includes an intermediate wall 174 offset from a proximal wall 176. The intermediate and proximal walls 174, 176 form an engagement surface sized and shaped to frictionally engage with the second boss 116 and the inner side segment 120, respectively, of the spline shaft 92 after assembly, as shown in FIG. 9. In more detail, the lateral, intermediate, and proximal walls 150, 174, 176 define a pulley cam surface configured to frictionally engage with the sector cam surface formed by the second boss 116 spaced between side segments 118, 120.

As shown in FIG. 4, the remote handle assembly 20 also includes a pulley spring 178, a spline shaft spring 180, and a pair of threaded insert/nuts 182. The pulley spring 178 is a torsion spring having opposing spring legs 184, 186 and a loop portion having an inner diameter larger than an outer diameter of the collar 136. The spline shaft spring 180 is also a torsion spring having opposing spring legs 188, 190 and a loop portion having an inner diameter larger than an outer diameter of the cylindrical section 94 of the spline shaft 92. The threaded insert/nuts 182 have a proximal end sized and shaped to fit within respective bores 42 in the rear housing 22 and a distal end sized and shaped to fit within respective mounting holes 66 in the front housing 24.

FIGS. 3-9 illustrate an assembly method of the remote handle assembly 20 according to one embodiment of the present invention. Referring to FIG. 4, the proximal ends of the threaded insert/nuts 182 are inserted into the respective bores 42 in the rear housing 22. The OTF pulley 126 is slid onto the boss 34 in the rear housing 22 with the passageway 140 aligned with the boss 34 and the bottom surface 148 of the OTF pulley 126 facing the rear housing 22. The pulley spring 178 is slid onto the OTF pulley 126 with the collar 136 extending through the loop portion of the pulley spring 178. One spring leg 186 is inserted into the spring notch 134 in the OTF pulley 126. The other spring leg 184 abuts the ledge 46 extending from the tab 48 in the rear housing 22, as shown in FIG. 5. Next, the spline shaft 92 is slid onto the boss 34 in the rear housing 22 with the boss 34 aligned with the passageway 98 in the spline shaft 92 and with the cylindrical section 94 oriented away from the OTF pulley 126. Referring to FIG. 7, the loop portion of the spline shaft spring 180 is slid over the cylindrical portion 94 of the spline shaft 92 and one of the spline spring legs 190 is inserted into the notch 122 in the spline shaft 92. As illustrated in FIG. 5, the other one of the spline spring legs 188 abuts the ledge 46 and the tab 48 in the rear housing 22.

Referring to FIG. 9, the pulley spring 178 is operatively coupled between the OTF pulley 126 and the rear housing 22. The pulley spring 178 applies a bias force to the OTF pulley 126 urging the OTF pulley 126 to rotate in a clockwise direction as viewed in FIG. 9. The pulley spring 178 causes the trailing side 130 of the OTF pulley 126 to frictionally engage with the stop surface 44 in the rear housing 22 when the OTF pulley 126 is unactuated. In addition, the spline shaft spring 180 is operatively coupled between the spline shaft 92 and the rear housing 22. The spline shaft spring 180 applies a bias force to the spline shaft 92 urging the spline shaft 92 to rotate in the clockwise direction as viewed in FIG. 9. The spline shaft spring 180 causes the stop boss 114 on the spline shaft 92 to frictionally engage with the stop surface 44 in the rear housing 22 when the spline shaft 92 is unactuated.

Also referring to FIG. 9, after the spline shaft spring 180 is assembled with the spline shaft 92, the power and manual cable attachments 78, 88 are inserted into respective U-shaped slots 32, 32' in the rear housing 22. A ball fitting 192 is fixedly coupled to a proximal end of the power Bowden cable 76. Referring to FIGS. 6-9, the power Bowden cable 76 is inserted into the center pulley channel 164 and through the narrow slot 168 in the outer wall 158 of the OTF pulley 126 and through the opening in the trailing side 130 such that the ball fitting 192 abuts the trailing side 130. The power Bowden cable 76 is slidably coupled to the center pulley channel 164. In addition, the power Bowden cable 76 is retained within the center pulley channel 164 since the ball fitting 192 is larger than the opening in the trailing side 130.

The outboard and inboard Bowden cables 86, 86' are terminated with respective crossbar stop sleeves 194. The crossbar stop sleeve 194 attached to one of the Bowden cables 86, 86' is inserted into the upper attachment location in the aperture 146 of the OTF pulley 126 with the Bowden cable 86, 86' inserted through the upper slot 156 and into the upper pulley channel 154. The Bowden cable 86, 86' is also inserted into the pulley channel 102 in the spline shaft 92. In addition, the crossbar stop sleeve 194 attached to the other one of the Bowden cables 86, 86' is inserted into the lower attachment location in the aperture 146 with the Bowden cable 86, 86' inserted through the lower slot 162 and into the lower pulley channel 160 in the OTF pulley 126. Referring to FIG. 4, the front housing 24 is slid onto the spline shaft 92 with the cylindrical section 94 extending through the spline hole 68 in the front housing 24. The front housing 24 is fixedly coupled to the rear housing 22 by snapping the U-shaped tabs 60 on the front housing 24 over the triangular shaped projections 56 on the rear housing 22.

Figure 2:
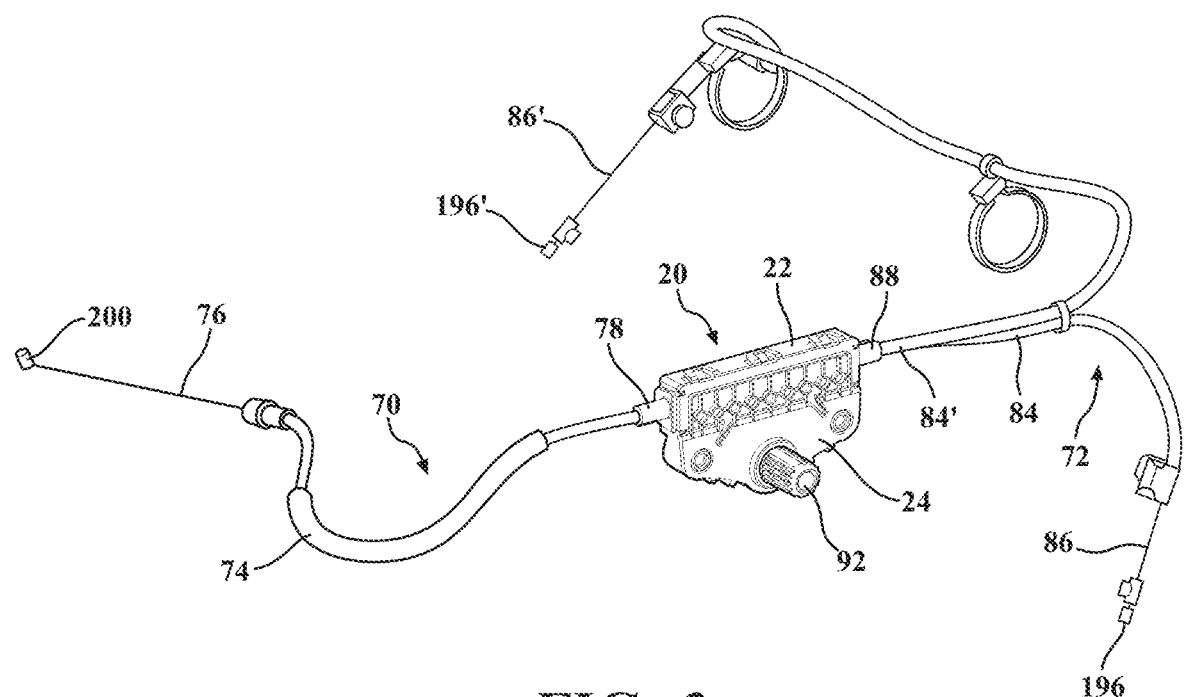
FIG. 2 is a perspective view of the remote handle assembly of FIG. 1.

Referring to FIGS. 1 and 2, distal ends 196, 196' of the outboard and inboard Bowden cables 86, 86' are operatively coupled to the release lever 18 of respective recliner mechanisms 16. The remote handle assembly 20 is configured to actuate the release levers 18 by applying tension to the outboard and inboard Bowden cables 86, 86' to remotely unlock the recliner mechanisms 16.

The seat assembly 10 also includes a power actuator 198 operatively coupled to the remote handle assembly 20 via the power Bowden cable 76. A distal end 200 of the power Bowden cable 76 is operatively coupled to the power actuator 198. The power actuator 198 applies tension to the power Bowden cable 76 while the power actuator 198 is actuated. The tension is removed from the power Bowden cable 76 when the power actuator 198 is deactivated.

Figure 10:
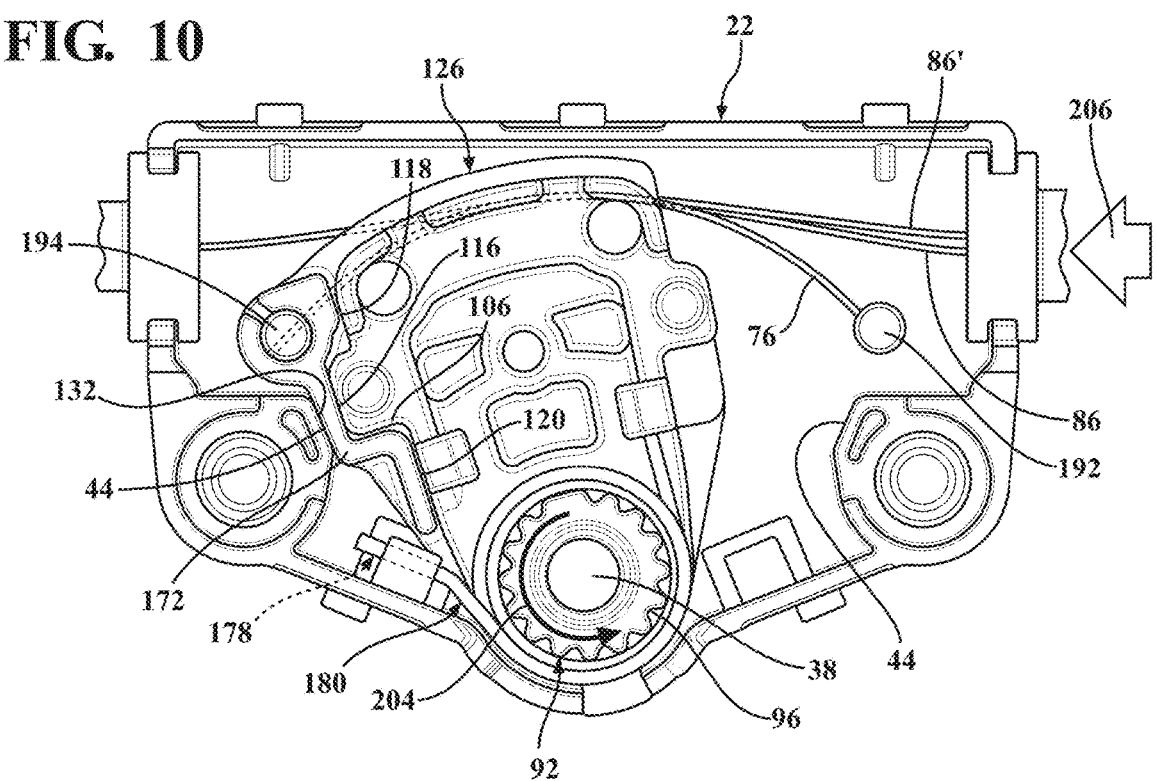
FIG. 10 is a cutaway top view of the remote handle assembly of FIG. 9 in an actuated condition.

The seat assembly 10 also includes a recliner handle 202 positioned for easy access by the occupant and operatively coupled to the remote handle assembly 20, as illustrated in FIG. 1. The recliner handle 202 has an internal spline configured to matingly engage with the external spline 96 on the spline shaft 92. The recliner handle 202 is rotatable about the axis of rotation 38 of the spline shaft 92 between an unactuated position (shown as recliner handle 202) and an actuated position (shown as recliner handle 202'). The corresponding unactuated and actuated positions of the spline shaft 92 are shown in FIGS. 9 and 10, respectively. The recliner handle 202 is spring-biased towards the unactuated position by the spline shaft spring 180 operatively coupled between the spline shaft 92 and the rear housing 22.

Referring to FIGS. 1 and 9-11, to unlock the recliner mechanisms 16, the occupant rotates the recliner handle 202 about the axis of rotation 38 from the unactuated position to the actuated position, shown as element 202' in FIG. 1. Rotating the recliner handle 202 to the actuated position 202' causes the spline shaft 92 to rotate from the unactuated position (FIG. 9) in the counterclockwise direction (arrow 204) as viewed in FIG. 10 towards the actuated position (FIG. 10). The leading side 106 of the spline shaft 92 frictionally engages with the flange 172 on the OTF pulley 126, causing the OTF pulley 126 to rotate in the counterclockwise direction (arrow 204) from a second unactuated position (FIG. 9) with the spline shaft 92 to a second actuated position (FIG. 10). The spline shaft 92 and the OTF pulley 126 may be rotated in the counterclockwise direction (arrow 204) until the leading side 132 of the flange 172 frictionally engages with one of the stop surfaces 44 in the rear housing 22. Tension is applied to the outboard and inboard Bowden cables 86, 86' (arrow 206) as the OTF pulley 126 rotates in the counterclockwise direction (arrow 204). However, the counterclockwise rotation (arrow 204) of the OTF pulley 126 does not apply tension to the power Bowden cable 76 since the power Bowden cable 76 can freely slide along the center pulley channel 164. The recliner handle 202 allows the occupant to release the recliner mechanisms 16 via the upper and lower pulley channels 154, 160 in the OTF pulley 126.

The rotation of the OTF pulley 126 to the second actuated position shown in FIG. 10 applies tension (arrow 206) to the outboard and inboard Bowden cables 86, 86', which actuates the release levers 18 to unlock the recliner mechanisms 16. The occupant may pivot the seat back 12 relative to the seat cushion 14 while the occupant retains the recliner handle 202 in the actuated position 202' and the recliner mechanisms 16 are unlocked.

After the occupant releases the recliner handle 202, the spline shaft spring 180 rotates the spline shaft 92 about the axis of rotation 38 in a clockwise direction (arrow 204' in FIG. 9) from the actuated position (FIG. 10) to the unactuated position (FIG. 9), which returns the recliner handle 202 to the unactuated position (FIG. 1). In addition, the pulley spring 178 rotates the OTF pulley 126 in the clockwise direction (arrow 204') about the axis of rotation 38 from the second actuated position (FIG. 10) to the second unactuated position (FIG. 9) since the load applied by the spline shaft 92 onto the OTF pulley 126 has been removed. When the OTF pulley 126 is returned to the second unactuated position (FIG. 9), tension is removed from the outboard and inboard Bowden cables 86, 86', which removes the tension applied to the release levers 18 and causes the recliner mechanisms 16 to automatically relock.

Figure 11:
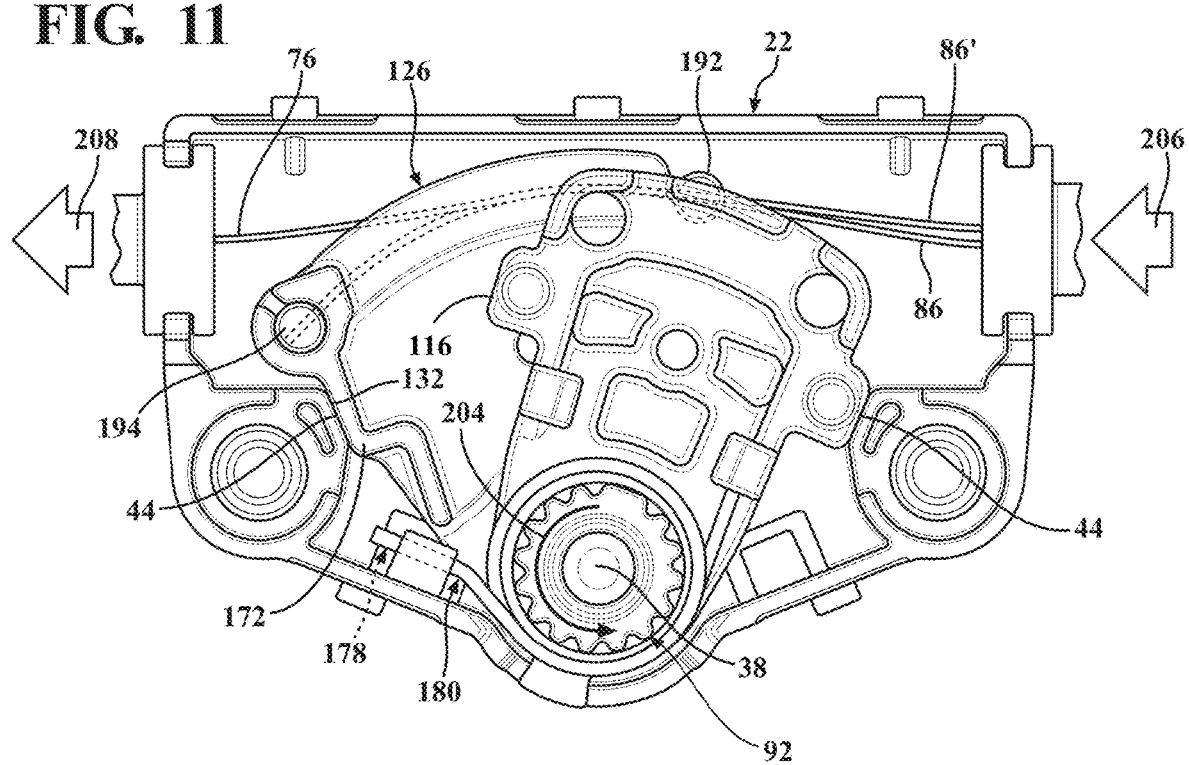
FIG. 11 is a cutaway top view of the remote handle assembly of FIG. 10 in a power actuated condition.
Figure 14:
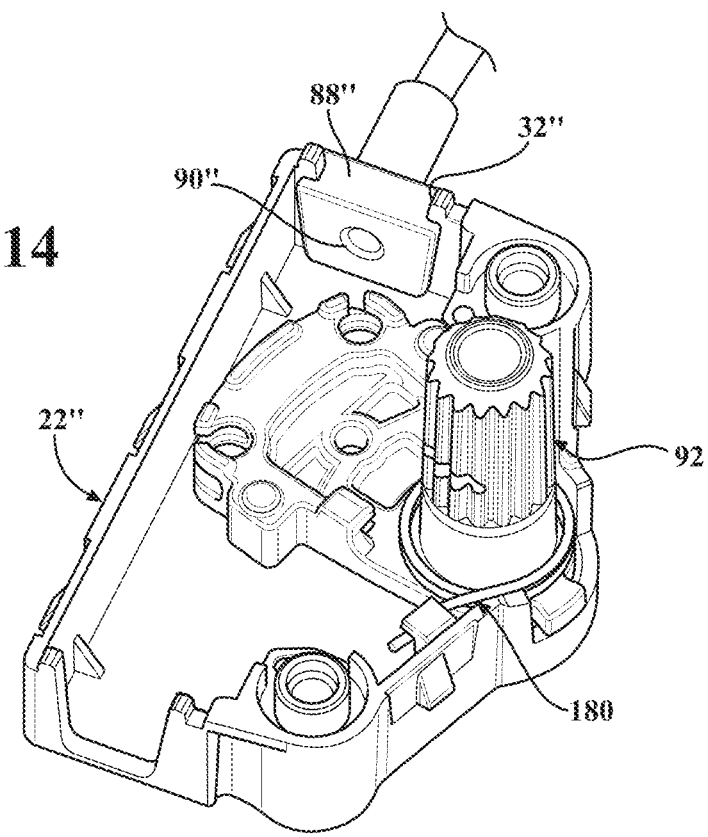
FIG. 14 is a cutaway perspective view of the remote handle assembly of FIG. 13.

Referring to FIG. 11, when the occupant initiates a fold flat function, the power actuator 198 applies tension (arrow 208) to the power Bowden cable 76 causing the OTF pulley 126 to rotate about the axis of rotation 38 in the counterclockwise direction (arrow 204) from the second unactuated position (FIG. 9) to the second actuated position (FIG. 11). The rotation of the OTF pulley 126 to the second actuated position (FIG. 11) applies tension (arrow 206) to the outboard and inboard Bowden cables 86, 86' thereby actuating the release levers 18 and causing the recliner mechanisms 16 to unlock. The seat back 12 may be rotated so that the seat back 12 overlays the seat cushion 14 while the recliner mechanisms 16 are unlocked. During the fold flat function, the recliner handle 202 is decoupled from the power actuator 198 so that the recliner handle 202 remains stationary while the power actuator 198 rotates the OTF pulley 126 to the second actuated position (FIG. 11). The spline shaft 92 is decoupled from the OTF pulley 126 since the Bowden cable 86, 86' attached to the upper attachment location freely slides along the pulley channel 102 in the spline shaft 92 as the OTF pulley 126 is rotated.

To relock the recliner mechanisms 16, the power actuator 198 removes tension from the power Bowden cable 76, which allows the pulley spring 178 to rotate the OTF pulley 126 about the axis of rotation 38 in the clockwise direction (arrow 204') towards the unactuated position (FIG. 9). Tension is removed from the outboard and inboard Bowden cables 86, 86', which removes the tension applied to the release levers 18 and causes the recliner mechanisms 16 to automatically relock.

Figure 15:
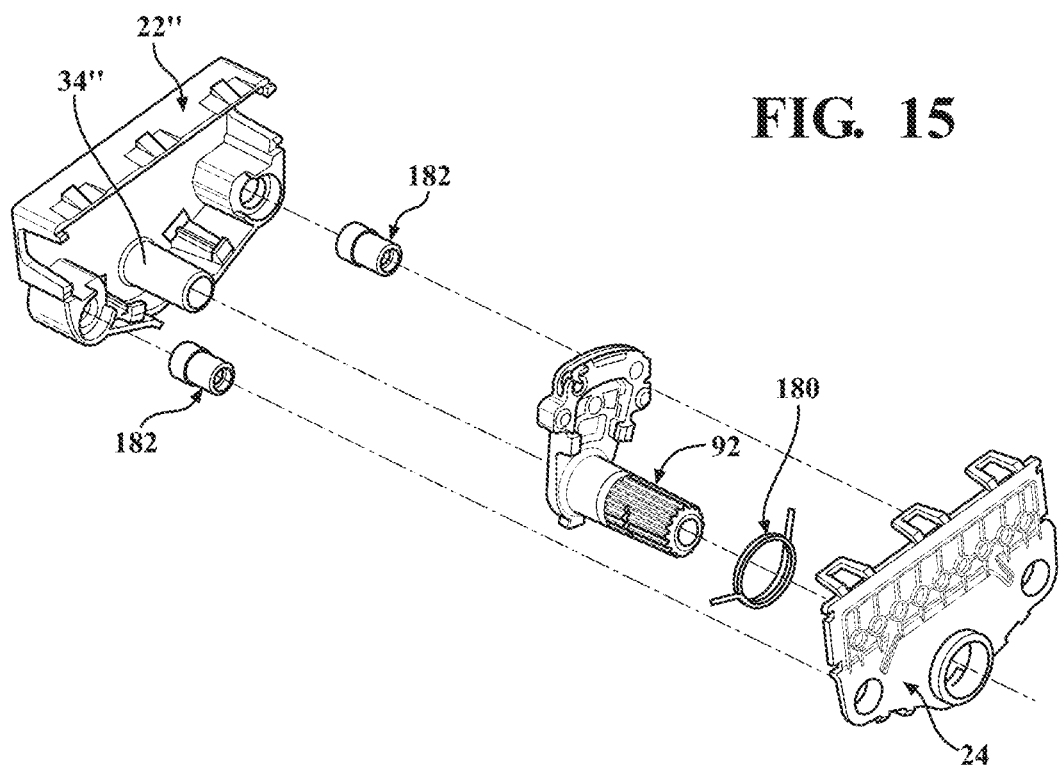
FIG. 15 is an exploded view of the remote handle assembly of FIG. 13.
Figure 16:
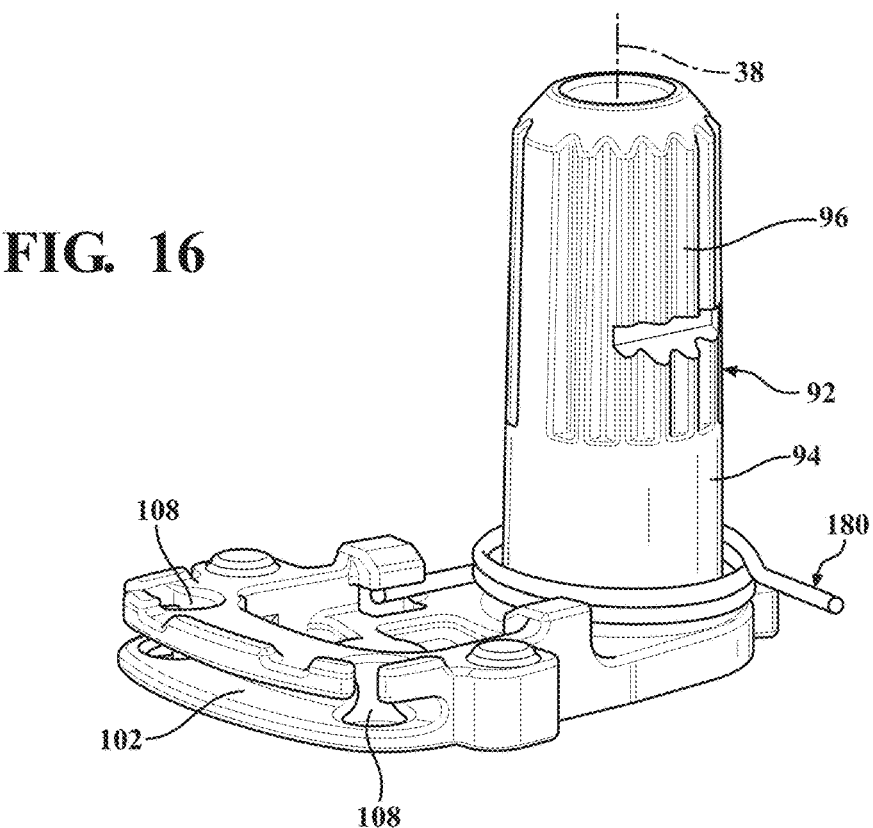
FIG. 16 is a cutaway right side view of a portion of the remote handle assembly of FIG. 13.

A second embodiment of the remote handle assembly 20" is shown in FIGS. 12-18, where like double primed reference numerals represent similar elements as those described above. The second embodiment depicts a non-OTF version of the remote handle assembly 20". Only significant differences between the two embodiments are reflected in the Figures and the description below. In the second embodiment of the remote handle assembly 20", the rear housing 22" has a reduced depth in comparison to the rear housing 22 in the first embodiment. Referring to FIG. 12, the outboard Bowden cable 86" of the mechanism cable assembly 72" extends longitudinally through the outer casing 84", through the passageway 90" in the manual cable attachment 88", and into the rear housing 22". Referring to FIG. 15, after the threaded insert/nuts 182, the spline shaft 92, and the spline shaft spring 180 are assembled with the rear housing 22", the crossbar stop sleeve 194" is inserted into the attachment hole 108 on the spline shaft 92 and the outboard Bowden cable 86" is inserted into the pulley channel 102, as reflected in FIG. 17, and the front housing 24 is attached to the rear housing 22". It will be appreciated that one or more Bowden cables 86" may be attached to the spline shaft 92 without altering the scope of the present invention.

Figure 17:
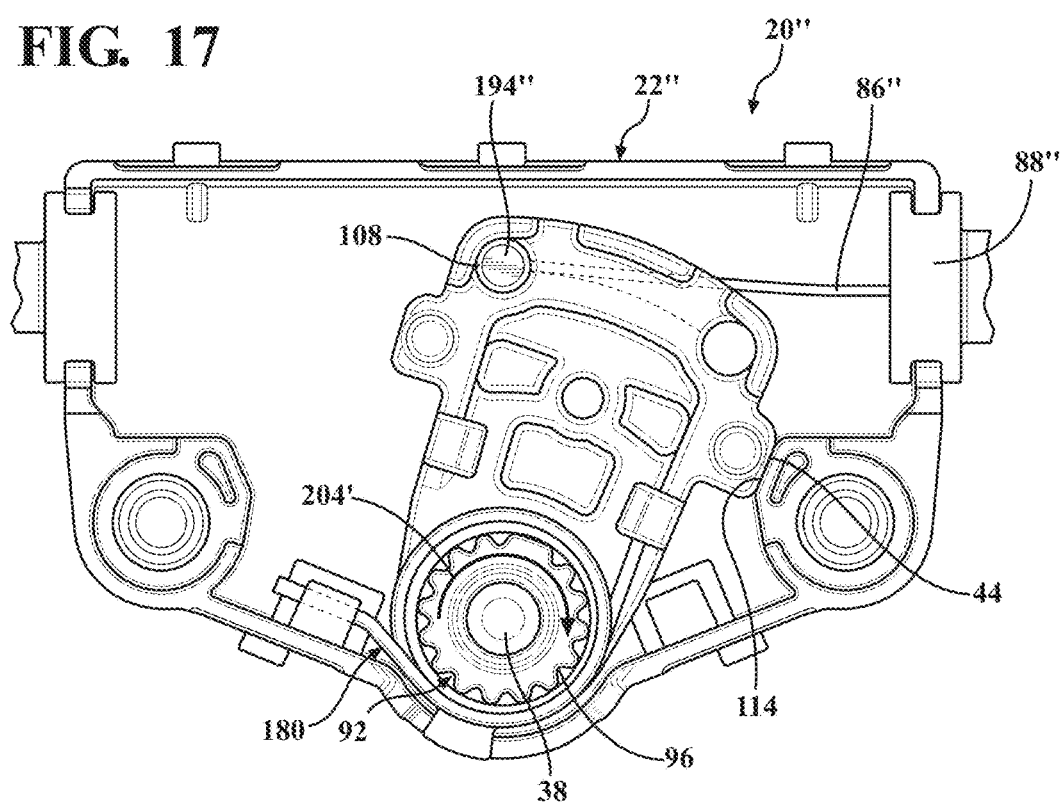
FIG. 17 is a cutaway top view of the remote handle assembly of FIG. 13 in an unactuated condition.
Figure 18:
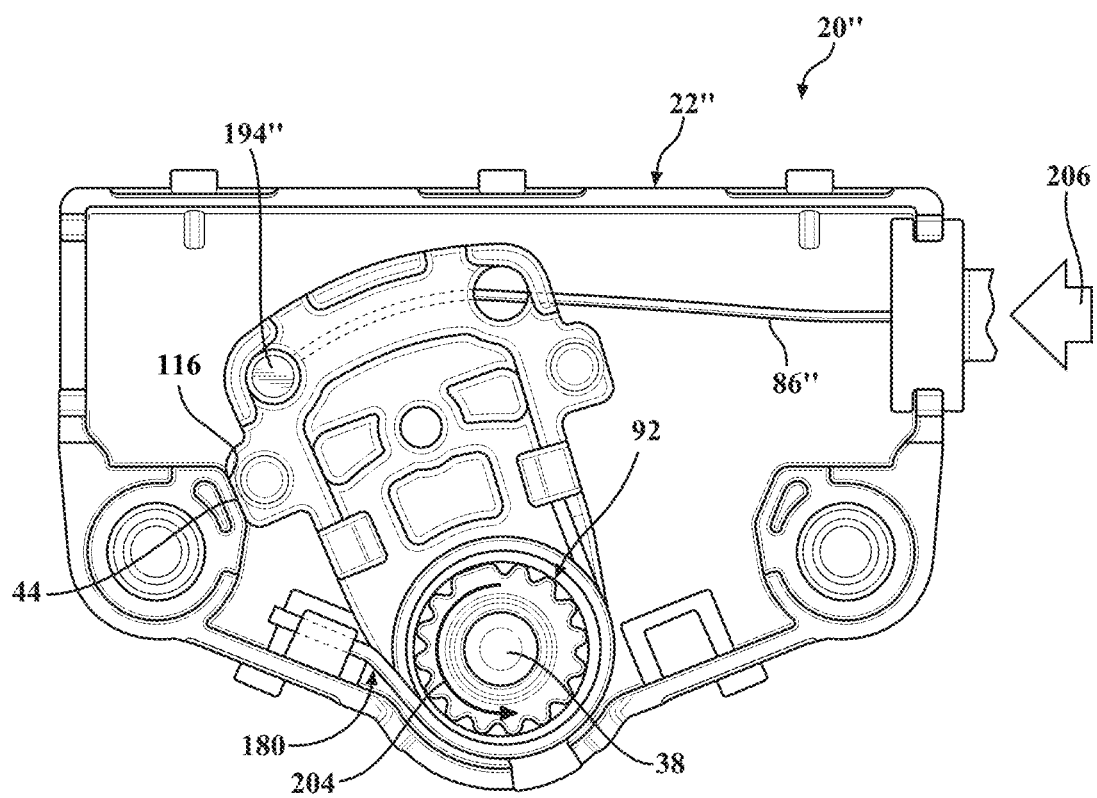
FIG. 18 is a cutaway top view of the remote handle assembly of FIG. 17 in an actuated condition.

The remote handle assembly 20" is shown fully assembled in FIG. 17 with the spline shaft 92 in the unactuated position. Rotating the recliner handle 202 in the counterclockwise direction (arrow 204) to the actuated position causes the spline shaft 92 to rotate to the actuated position shown in FIG. 18. In the actuated position, the leading side 106 of the spline shaft 92 frictionally engages with the stop surface 44 in the rear housing 22". Tension (arrow 206) is applied to the outboard Bowden cable 86" as the spline shaft 92 rotates towards the actuated position, causing the recliner mechanisms 16 to unlock. When the recliner handle 202 is released by the occupant, the spline shaft spring 180 automatically rotates the spline shaft 92 in the clockwise direction (arrow 204') to the unactuated position (FIG. 17). Tension is removed from the outboard Bowden cable 86", which removes the tension applied to the release levers 18 and causes the recliner mechanisms 16 to automatically relock.

As discussed above, the remote handle assembly 20, 20" of the present invention includes common components in the OFT version and the non-OFT version with the rear housing 22, 22" adjusted in depth to accommodate the additional components in the OTF version. In addition, the spline shaft 92 is decoupled from the OTF pulley 126 while the power actuator 198 is applying tension to the power Bowden cable 76 without requiring additional decoupling components. The reduction in components in the remote handle assembly 20, 20" and the use of common parts between the OTF and non-OFT versions reduce component cost and reduce manufacturing process complexity.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A remote handle assembly for selectively unlocking a component in a seat assembly for an automotive vehicle, the remote handle assembly comprising:
   a rear housing having a boss;
   a spline shaft pivotally coupled to the boss around an axis of rotation, wherein the spline shaft includes a cam surface and a pulley channel extending circumferentially around the axis of rotation, wherein the spline shaft is pivotable between an unactuated position and an actuated position; and
   a pulley pivotally coupled to the boss around the axis of rotation, wherein the pulley includes an engagement surface and an upper pulley channel extending circumferentially around the axis of rotation, wherein the pulley is pivotable between a second unactuated position and a second actuated position, wherein:
   the pulley is spaced between the spline shaft and the rear housing;
   the upper pulley channel in the pulley axially aligns with the pulley channel in the spline shaft; and
   the cam surface of the spline shaft is configured to frictionally engage with the engagement surface on the pulley as the spline shaft rotates towards the actuated position.

2. The remote handle assembly as set forth in claim 1, wherein the pulley further includes an attachment aperture connected to the upper pulley channel and a center pulley channel extending circumferentially around the axis of rotation, and wherein the remote handle assembly further comprises:
   a release Bowden cable fixedly coupled to the attachment aperture, wherein the release Bowden cable extends along the upper pulley channel and along the pulley channel in the spline shaft; and
   a power Bowden cable slidably coupled to the center pulley channel.

3. The remote handle assembly as set forth in claim 2, wherein rotating the spline shaft from the unactuated position to the actuated position causes the pulley to rotate to the second actuated position and causes tension to be applied to the release Bowden cable.

4. The remote handle assembly as set forth in claim 3, wherein applying tension to the power Bowden cable causes the pulley to rotate to the second actuated position and causes tension to be applied to the release Bowden cable while the spline shaft remains in the unactuated position.

5. The remote handle assembly as set forth in claim 4, further comprising a spline shaft spring operatively coupled between the spline shaft and the rear housing to bias the spline shaft towards the unactuated position.

6. The remote handle assembly as set forth in claim 5, further comprising a pulley spring operatively coupled between the pulley and the rear housing to bias the pulley towards the second unactuated position.

7. The remote handle assembly as set forth in claim 6, wherein the pulley further comprises:
   a lower pulley channel extending circumferentially around the axis of rotation; and
   a second attachment aperture connected to the lower pulley channel.

8. The remote handle assembly as set forth in claim 7, wherein the remote handle assembly further comprises a second release Bowden cable fixedly coupled to the second attachment aperture and extending along the lower pulley channel.

9. The remote handle assembly as set forth in claim 8, wherein the spline shaft further comprises a third attachment aperture connected to the pulley channel providing an alternate attachment location for the release Bowden cable.

10. The remote handle assembly as set forth in claim 9, wherein the spline shaft further includes a cylindrical section having a passageway extending longitudinally along the axis of rotation and a sector extending radially from a proximal end of the cylindrical section, and wherein the pulley channel extends circumferentially along an outer end of the sector.

11. The remote handle assembly as set forth in claim 10, wherein the cylindrical section includes an external spline configured to be coupled with a recliner handle.

12. The remote handle assembly as set forth in claim 11, wherein the pulley includes a collar having a second passageway extending along the axis of rotation and a sector-shaped base extending radially from the collar, wherein the upper, center, and lower pulley channels extend circumferentially along an outer end of the sector-shaped base.

13. The remote handle assembly as set forth in claim 12, wherein the boss projects through the second passageway in the collar of the pulley and projects into the passageway in the cylindrical section of the spline shaft.

14. The remote handle assembly as set forth in claim 13, wherein the pulley spring includes a spring loop and the collar projects into the spring loop.

15. The remote handle assembly as set forth in claim 14, wherein the spline shaft spring includes a second spring loop and the cylindrical section of the spline shaft projects into the second spring loop.

16. The remote handle assembly as set forth in claim 15, further comprising a front housing having a spline hole, wherein at least a portion of the cylindrical section of the spline shaft extends through the spline hole when the front housing is fixedly coupled to the rear housing.

17. The remote handle assembly as set forth in claim 16, wherein the pulley channel in the spline shaft comprises a first pulley channel and a second pulley channel with the upper pulley channel axially aligned with the first pulley channel and the lower pulley channel axially aligned with the second pulley channel.

18. The remote handle assembly as set forth in claim 17, wherein the release Bowden cable extends along the upper pulley channel and the first pulley channel, and the second release Bowden cable extends along the lower pulley channel and the second pulley channel.

\* \* \* \* \*